United States Patent [19]
Merle et al.

[11] Patent Number: 5,600,384
[45] Date of Patent: Feb. 4, 1997

[54] SELF ALIGNING MAGNETIC MEDIA FOLLOWER DEVICE

[75] Inventors: Thomas C. Merle; David L. Rowden; Dale W. Ryan, all of Rochester, N.Y.

[73] Assignee: Eastman Kodak Company, Rochester, N.Y.

[21] Appl. No.: 430,671

[22] Filed: Apr. 28, 1995

[51] Int. Cl.$^6$ ............................ G03B 31/02; G03B 17/24
[52] U.S. Cl. .............................................. 352/27; 396/319
[58] Field of Search ................................... 354/105, 106; 360/104, 3, 109; 352/27

[56] References Cited

U.S. PATENT DOCUMENTS

| | | | |
|---|---|---|---|
| 3,725,442 | 4/1972 | Marvel et al. | 260/405 |
| 4,809,028 | 2/1989 | Gagnon | 346/108 |
| 5,034,836 | 7/1991 | DeMarti, Jr. et al. | 360/104 |
| 5,041,933 | 8/1991 | DeMarti, Jr. et al. | 360/104 |
| 5,274,522 | 12/1993 | Taillie | 360/130.3 |
| 5,285,324 | 2/1994 | Weigand et al. | 260/104 |
| 5,285,325 | 2/1994 | Kiesow | 360/3 |
| 5,469,313 | 11/1995 | Isozaki et al. | 360/104 |

*Primary Examiner*—Safet Metjahic
*Assistant Examiner*—Christopher E. Mahoney
*Attorney, Agent, or Firm*—Cumpston & Shaw

[57] ABSTRACT

A ball carrier mounting assembly for limiting the angular movement of a film follower device having, a pair of upper ball cages, each upper ball cage further having a lug for engaging a notch, a tube extending through the thickness of the cage and protruding below the lower surface, and a plurality of ball pockets, an asymmetrically shaped, mounting plate located underneath the pair of upper ball cages having a body and first and second end tabs, for attaching the assembly to a fixed support, wherein each end tab of the mounting plate has a different configuration for orienting the apparatus, the body having in addition a pair of apertures spaced from the tab ends for accommodating the tubes, and a pair of lower ball cages located below the mounting plate, each lower ball cage further having a lug protruding downwards for engaging a notch, an aperture extending through the thickness of the lower cage for receiving the tube therein, and a plurality of ball pockets, is described. A magnetic head-to-media apparatus for recording information on a magnetic film media containing the ball carrier mounting assembly of the invention is also described.

26 Claims, 3 Drawing Sheets

5,600,384

SELF ALIGNING MAGNETIC MEDIA FOLLOWER DEVICE

FIELD OF THE INVENTION

This invention relates to a self aligning, small motion film edge follower device for a magnetic head-to-media interface apparatus and more particularly to an asymmetric ball carrier mounting plate assembly included in the device.

BACKGROUND OF THE INVENTION

The basic function of a magnetic media follower device is to control the intimate contact between the magnetic head and the magnetic media, such as a photographic film or magnetic tape. To accomplish this there are two primary functional requirements. A load applying member, frequently in the form of a leaf or reed-like spring, forces the media against the surface of the head for magnetic reading or writing. The second is the ability for the device to track the edge of the media by means of a follower unit so that variations in the cut quality of the media or inaccuracies due to splicing of media do not impact the positioning of the head relative to the edge of the media.

Known follower units incorporate a multiple function ball carrier assembly which responds to variations in the edge of a media by swiveling through a small angle on the bearing balls of the plate. Such carders require sufficient clearances between adjacent surfaces of the assembly and between the bearing balls and their receptacles to allow motion of the assembly. Excessive clearances result in contamination from dust and dirt particles and wear on parts which move relative to other parts. Excessive angular travel due to the excessive clearances can result in an unstable condition that can cause damage to surrounding assemblies or critical components of the follower assembly. Furthermore in a two-head device it is critical that adequate design features be included to ensure that the different heads are correctly oriented with respect to the magnetic tracks on each edge of the media.

A consideration in designing magnetic follower devices for photo finishing equipment which are subject to extensive use and wear is that the component parts be replaceable without requiting full disassembly of the mechanical unit. In a two-head device it is desirable to have an inventory of critical parts that can be used on either side of the assembly and to minimize parts with left and right hand components.

U.S. Pat. No. 5,034,836 discloses a magnetic head suspension apparatus for use with photographic film which includes a movable support mounted for movement through an arc having a predetermined radius and a pair of magnetic head suspension assemblies each rotatably mounted on the moveable support. The suspension assemblies are biased towards each other to cause surfaces of the magnetic head assemblies to engage opposite edges of a photographic film respectively. One of the suspension assemblies is fixed and acts as a stop which locates the entire suspension apparatus relative to the position of a film, while the other side floats and moves relative to the centerline of a film. With this arrangement the fixed edge side must be precisely aligned with other components in the film path to ensure smooth transport of the film. The entire assembly is formed of symmetrical components.

U.S. Pat. No. 5,274,522 discloses a magnetic head-to-media backer device comprising a member adapted to urge a flexible magnetic media into contact with a magnetic head. The rigid frame for holding the member has a cavity and various embodiments of the cavity are described.

U.S. Pat. No. 5,285,324 discloses a magnetic reading and/or recording apparatus which includes a plurality of magnetic reading and/or recording elements to read and/or record information from/on a flexible magnetic recording material, and a flexible plate. A means for arranging the elements and the flexible plate to contact the magnetic recording material with the elements is included, the arranging means includes a pressure pad mounting block having a recess to accept the flexible plate.

U.S. Pat. No. 5,285,325 discloses a two-headed magnetic recording or playback assembly for a camera that includes two symmetrical pressure pad mounting blocks.

It is an object of this invention to provide a follower assembly designed with minimal clearances between components to prevent contamination and wear.

It is an object of this invention to provide a follower device with a ball carrier mounting plate assembly having dissimilar ends which enables the device to be correctly oriented in an apparatus.

It is an object of this invention to provide a follower device with a ball carrier mounting plate assembly in which both sides float relative to the centerline of a media being tracked.

It is an object of this invention to provide a follower device designed to rotate with a minimal angular travel without causing excessive movement and unstable conditions during tracking.

It is an object of this invention to provide a follower device designed to minimize positional inaccuracies by including interface features such as tabs, slots and notches to minimize assembly variations.

SUMMARY OF THE INVENTION

Briefly stated and in accordance with one aspect of this invention there is provided a ball carrier mounting assembly for limiting the angular movement of a film edge follower device comprising, a pair of upper ball cages having upper and lower surfaces, each upper bah cage further comprising a lug protruding from the upper surface for engaging a notch, a tube extending through the thickness of the cage and protruding below the lower surface, and a plurality of ball pockets extending through the thickness of the cage, an asymmetrically shaped, mounting plate located underneath the pair of upper ball cages having a body and first and second end tabs, for attaching the assembly to a fixed support, wherein each end tab of the mounting plate has a different configuration for orienting the apparatus, the body having in addition a pair of apertures spaced from the tab ends for accommodating the tubes, and a pair of lower ball cages having upper and lower surfaces located below the mounting plate, each lower ball cage further comprising a lug protruding downwards from the lower surface for engaging a notch, an aperture extending through the thickness of the lower cage for receiving the tube therein, and a plurality of ball pockets extending through the thickness of the cage.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
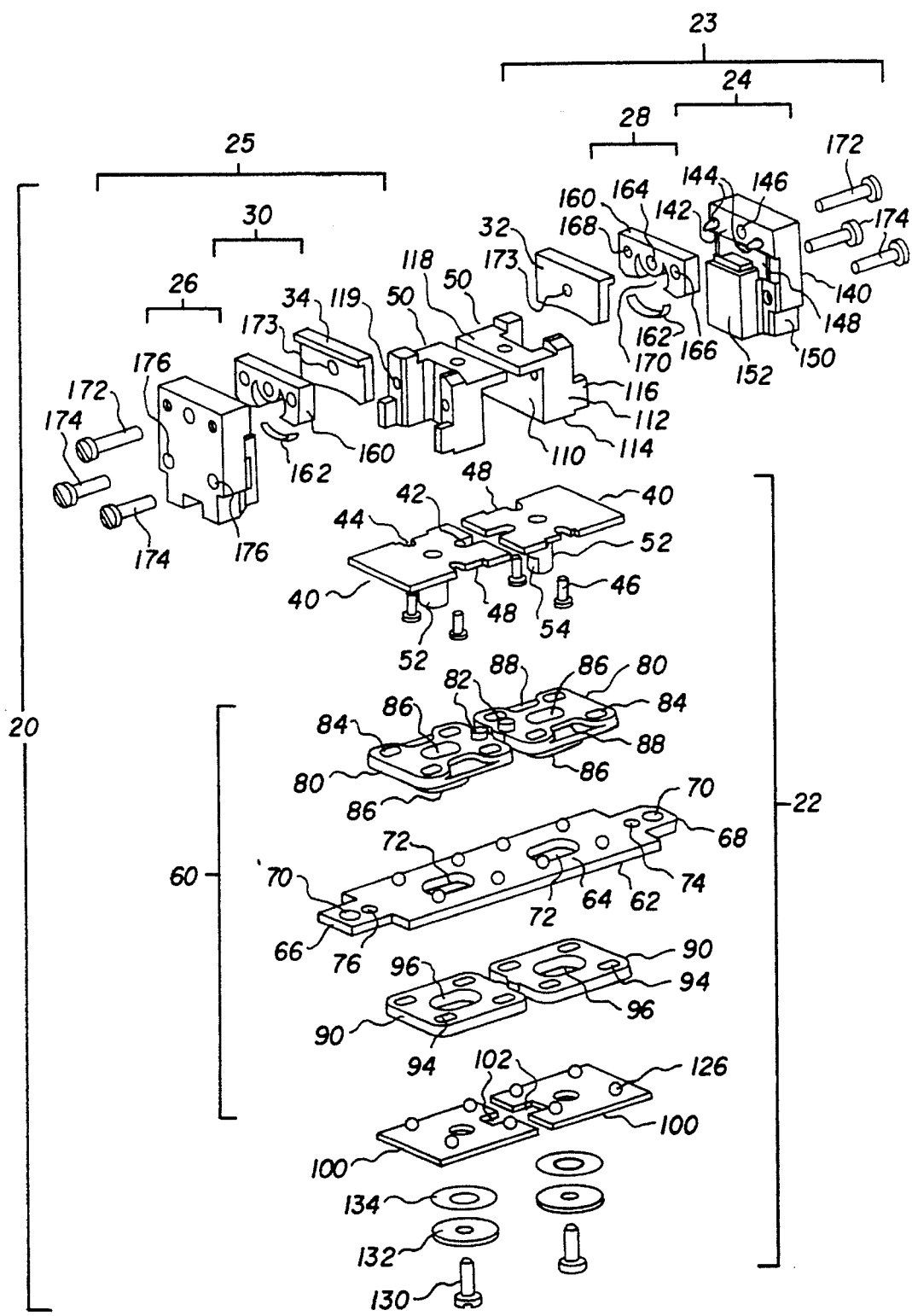
FIG. 1 is an exploded perspective view of a magnetic head-to-magnetic media interface apparatus.

The invention is disclosed for a ball carrier mounting device as being incorporated in a self aligning, small motion, film edge follower device for a magnetic head-to-media interface apparatus, such as is described in FIG. 1, in which it serves to ensure that the orientation of the follower unit is correct when the apparatus is assembled to a piece of photo finishing equipment and that minimal angular travel of the follower unit takes place. Because such an interface apparatus is well known this description is directed in particular to those components forming part of or directly cooperating with the disclosed embodiment of the invention. It is to be understood that the ball carrier mounting device may have other applications not specifically shown or described.

A detailed description of a magnetic head-to-media interface apparatus is described to relate the interaction of the ball carrier mounting device with other components and its advantages. In such equipment it is possible to require a different head assembly, i.e. read or write or inactive on either side of the follower unit. By incorporating an asymmetric mounting device such as the mounting device of the invention the appropriate head assembly is guaranteed even if the follower unit is removed for repair.

Referring to the drawings and more specifically to FIG. 1, the disclosed embodiment of the magnetic head-to-media interface apparatus 20 for recording information on or reading information from a media comprises a follower assembly 22 which comprises a pair of head blocks 50, a ball carrier mounting plate assembly 60, a pair of top bearing plates 40 and a pair of bottom bearing plates 100, and magnetic head-to-media backer assemblies 23, 25, which comprise head and backer assemblies 24, 26, magnetic head-to media backer devices or arched spring assemblies 28, 30 and film guide cover plates 32, 34 respectively.

FOLLOWER ASSEMBLY

The follower assembly 22 includes a pair of identical generally rectangular shaped top bearing plates 40. Each top bearing plate has a generally rectangular shaped notch 42 formed in the center of a short edge for limiting angular movement of the assembly. Each long edge has cut-out slots 44 for accommodating fasteners 46, and cut-out features 48 for receiving corresponding tabs of the head blocks 50. Each bearing plate is provided with a centrally located counter bored hole in which is fitted a swivel post 52. The post is preferably round with a lower D-shaped end. The posts are preferably adhesively attached to the bearing plates and protrude below the underside of each plate. Each swivel post has a flat area 54 at the lower D-shaped end and the post is oriented so that the flat faces the rectangular notch. In the assembled apparatus the notches of each bearing plate are oriented towards the center and are directly opposite each other.

The follower assembly 22 includes a ball carrier mounting plate assembly 60. The mounting plate assembly includes an asymmetrically shaped, elongated mounting plate 62. The mounting plate has a generally rectangular shaped main body 64 and differently configured end tabs 66, 68 for correctly orienting the plate when it is mounted to a structure of a suitable piece of equipment, for example, photo finishing equipment. This has the effect of correctly orienting the complete magnetic interface apparatus so that the magnetic heads are correctly oriented over the different magnetic tracks of a magnetic media. The end tabs are preferably narrower than the body. The one end 66 is, for example, rectangular with a squared end, and the other end 68 is, for example, generally rectangular with a chamfered end. Other end shapes could also be used. Each tab comprises a mounting hole 70 for receiving a fastener when mounted on a fixed structural component of, for example, recording or playback equipment, and locating holes 74, 76 for positioning the plate over corresponding locating pins of the equipment. In a preferred embodiment one of the locating holes 76 is round and the other locating hole 74 is generally obround shaped to reduce the tolerance requirements for positioning the mounting plate. The main body of the mounting plate has two generally obround shaped apertures 72 extending through the thickness of the plate and spaced equidistantly from the center of the body of the plate for receiving ball carrier components of the assembly.

The ball carrier mounting plate assembly 60 includes a pair of identical upper ball cages 80. Each upper ball cage is preferably generally rectangular in shape with, for example, chamfered corners. Each ball cage has an upstanding lug, for example a round lug 82, protruding upwards from the surface at the mid-point of and adjacent to the center facing short edge of each cage. Each cage has a plurality of ball pockets 84 extending through the thickness of the cage and positioned around the perimeter of the cage at each corner. In a preferred embodiment four ball pockets are located in each cage with one pocket adjacent to each corner. The ball pockets are generally obround or oval shaped. Preferably each pocket is generally obround shaped and sized with a width minimally greater than the ball diameter to allow motion of the ball and a length greater than the ball diameter to permit ball travel during limited angular and linear motion of the cage. Each cage has a centrally located cylindrical tube 86, preferably generally obround shaped, extending through the thickness of the cage and protruding below the cage for engaging an aperture 72 in the mounting plate. The round posts 52 of the bearing plates fit into the obround tubes 86 and are sized so that the diameter of the post is minimally less than the inside width of the tube opening to allow motion of the post within the tube and the inside length of the tube opening is greater than the post diameter to allow travel of the post along the opening during limited angular and linear motion of the follower assembly. The inner surface of the tube provides a bearing surface for the post. Each cage has two recesses 88 in the upper surface adjacent to the longitudinal edges for accommodating the heads of the fasteners 46.

Figure 5:
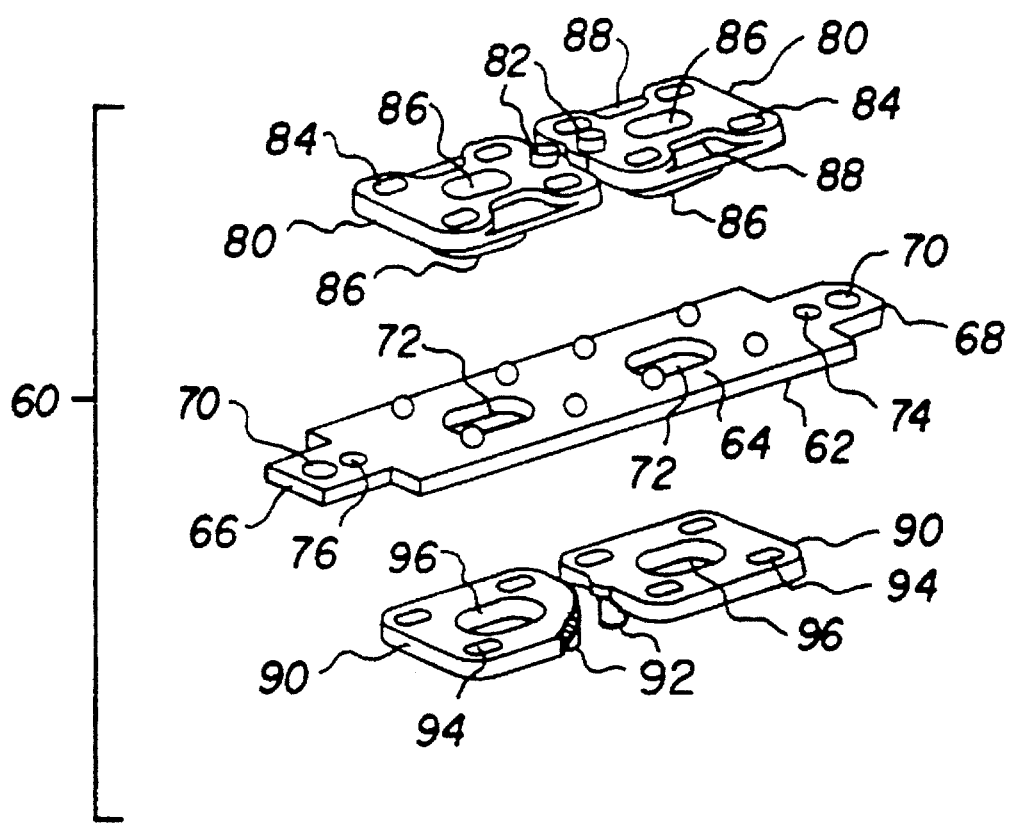
FIG. 5 is an enlarged cut away view of the ball carrier mounting assembly of FIG. 1.

The ball carrier mounting plate assembly further comprises a pair of identical lower ball cages 90. Each lower ball cage has a lug 92 see FIG. 5, in which a portion of one of the ball cages 90 is cut away to show the lugs 92 and a plurality of ball pockets 94 and has the same perimeter configuration as the upper ball cages. In the assembly the lug is oriented to protrude below the cage. Each lower ball cage has a centrally located, preferably generally obround shaped aperture 96 which extends through the thickness of the cage for receiving the corresponding cylindrical tube 86 protruding from the upper ball cage. The ball pockets are sized in the same manner as for the upper ball cages. The apertures 96 are sized to receive the cylindrical tubes of the upper ball cages. When assembled the bottom of the cylindrical tube is preferably flush with the bottom surface of the lower ball cage. The adjacent surfaces of the ball cages and the mounting plate contact each other so that there is no clearance between the mounting plate and adjacent ball cages.

In one embodiment of the ball carrier mounting plate assembly 60 it is assembled by inserting the tubes 86 of the upper ball cages through the corresponding apertures 72 of the mounting plate 62 and apertures 96 of the lower ball cages and adhesively bonding the parts together by applying a penetrating adhesive to the junction of the parts, taking care to avoid having any adhesive on the outer surfaces of the ball cages. In another embodiment of the invention the mounting plate assembly 60 can be formed by insert molding of the equivalent ball cages and mounting plate components to give a single unit. Such a molded assembly eliminates any clearance between the edges of the ball cages and the mounting plate and thus minimizes dust and dirt particles from getting to the balls.

The ball cages and the mounting plate can be plastic or metal and are preferably plastic, for example, a moldable plastic such as an acetal. The ball cage serves multiple functions, such as a physical carrier for bearing balls 126 which are contained therein, one ball in each one of the ball pockets. In order to properly position and control the ball location, a carrier with sufficient clearance in the pocket for the ball to permit motion is required. The ball cage serves as a contamination control feature to protect the balls and the critical surfaces of the mounting plate and the bearing plates 40, 100. The height of a ball cage 80, is minimally less than the diameter of the bearing balls. In effect the balls are surrounded and protected by the ball cage. A very small clearance is available for the gap between the ball cages and the bearing plates for introduction of dust and dirt particles. The interior tube 86 of the ball cage serves as a durable bearing material for the motion of swivel post 52 along the length of the tube opening and thus additional parts, materials or manufacturing difficulties can be eliminated.

The follower assembly includes a pair of identical, generally rectangular shaped bottom bearing plates 100. Each bottom bearing plate has a generally rectangular notch 102 formed in the center of a short edge for receiving the lug 92 of the lower ball cage and limiting angular movement of the assembly. Each bottom bearing plate has a generally D-shaped aperture extending through the thickness of the plate and is positioned essentially at the center of the plate. The flat side of the aperture faces the notch. The D-shaped aperture is dimensioned to receive the D-shaped swivel post 52 of the top bearing plate. In the assembled apparatus the notches are oriented towards the center and are directly opposite each other.

An important feature of the follower assembly 22 for a magnetic head-to-media assembly is the ability to "follow" the edge of a media passing between the magnetic heads as variations in a spliced film web and the edge condition of the filmstrip are encountered. The follower assembly must be free to rotate slightly to allow for these variations. However, excessive angular travel results in an unstable condition that can cause damage to surrounding assemblies or critical components of the follower assembly. As pan of each ball cage, a limit feature, for example small lug 82 on the top face of upper ball cage 80, has been included that restricts the maximum angular motion of the follower assembly during media tracking. The lug can be any suitable shape, for example a round or a rectangular post. The lug is preferably a round post with a diameter less than the width of the notch to permit limited angular movement of the follower assembly. The small lug engages with a predetermined amount of clearance into the rectangular notch 42 of the bearing plate 40. The follower assembly is free to rotate through an arc defined by the clearance between these two features. If the angular rotation becomes excessive, however, the lug on the ball cage contacts the side wall of the notch and prevents any further rotation of the follower assembly. In this way, the follower and the surrounding assemblies are protected from excessive angular motion outside the required functional range. The amount of the clearance and hence the degrees of angular motion are determined for each application of the device.

The follower assembly includes a pair of identical head blocks 50 for mounting the head and backer assemblies 24, 26 thereon. Each head block 50 has a generally rectangular face plate 110 with generally L-shaped side walls 112 attached to the short edges of the face plate along the length of the long leg. Each side wall is configured with bottom tabs 114 for fitting into the corresponding cut-out features 48 of the top bearing plates, and rear tabs 116 for fitting into corresponding recesses in the head and backer assembly. A generally rectangular shaped media bearing plate 118 bridges the side walls on top of the face plate and extends out toward the center. The bottom surface of each short leg of the side wall has a tapped hole for receiving fasteners 46 and thereby attaching the head block to the top bearing plate. The long leg of each side wall has a tapped hole 119 above the tab for receiving a mounting screw for attaching a head and backer assembly.

Figure 2:
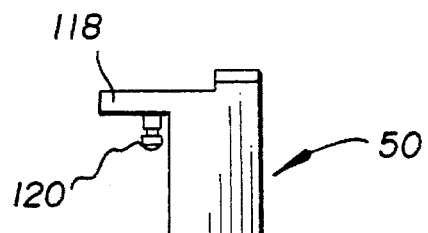
FIG. 2 is a side elevation view of a head block and spring post assembly.

Referring to FIG. 2, each media bearing plate 118 of the head block 50 has a spring post 120 mounted into an aperture of the plate midway between the side walls by press fitting from the top until it is flush with the top surface. The bottom protruding end has a groove for holding the end loop of an edge guide spring. The edge guide spring 122 (FIG. 4), connected to each head block post, biases the completely assembled magnetic head assemblies towards each other to align a magnetic media between the magnetic heads.

The combination of the design features, tubes 86, apertures 72, and notches 42, allows both sides of the magnetic head assemblies to float relative to the centerline of a magnetic media.

The follower head assembly is assembled according to the following preferred sequence of steps.

The two head blocks 50 with the spring posts are placed in a holding fixture with the tapped holes facing up. The loops of an edge guide spring are placed over the grooves of the spring posts. One bearing plate 40 and swivel post 52 assembly, swivel post up, is placed onto one of the block and post assemblies, positioned by mating the tabs 114 and cut-out features 48 and fastened with the fasteners 46 to the counter sunk holes. The procedure is then repeated for the other bearing plate and swivel post assembly. The swivel posts are lightly greased.

Figure 3:
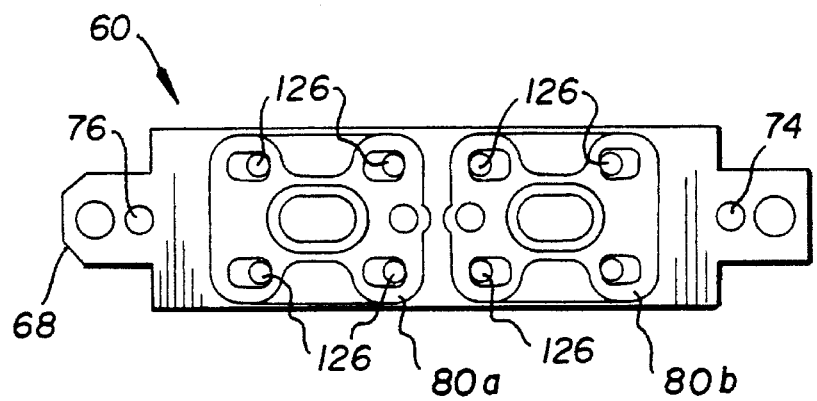
FIG. 3 is a top perspective view of a mounting plate assembly.

Referring to FIG. 3 the mounting plate assembly 60, formed by bonding the separate parts together as described above or by an insert molding process to give a single unit, and with the chamfered mounting tab 68 to the left and upper ball cages 80, separately identified as 80a and 80b, facing up is placed on a flat clean surface. Eight bearing balls 126 are coated with grease. Four of the bearing balls are placed, one in each of the pockets of ball cage 80a, so that each ball is on the right side of the pocket. Similarly four bearing balls are placed in ball cage 80b so that a ball is on the left side of each one of the pockets. Still keeping the chamfered tab on the left the mounting plate assembly 60, with bearing balls adhering, is inverted and placed over the swivel posts 52 of the pair of bearing plates mounted on the pair of spring connected block and post assemblies with one post inserted into each tube. Eight greased bearing balls are then inserted into the ball pockets 94 of the lower ball cages 84 with the same orientation of the balls. The diameter of each bearing ball is greater than the depth of the pocket to provide a small clearance between the ball carrier and the adjacent bearing plate. The diameter of each bearing ball is less than the length of the ball pocket to allow lateral movement of the bearing ball within the ball pocket.

One bottom bearing plate 100 is then placed over the D-shaped end of each swivel post 52. The rectangular notches on each of the top and bottom bearing plates fit over the corresponding lugs on each of the upper and lower ball cages. The lower bearing plates are fastened to the mounting plate assembly by fasteners inserted into each swivel post, for example, with screws 130, washers 132 and spring washers 134.

The entire assembly is capable of adjusting for angular variation of the media and for variations in media width and media edge irregularities.

Magnetic Heat-To-Media Backer Assembly

The magnetic head-to-media backer assemblies 23, 25 (FIG. 1) each include head and backer sub-assemblies 24, 26, magnetic head-to-media backer devices 28, 30 and film guide cover plates 32, 34 respectively.

The head and backer sub-assemblies 24, 26 differ only in the nature of the head component. The head component may be a recording head, a reading head or an inactive magnetic head depending on the purpose of the equipment on which the assembly is mounted. The head and backer assembly 24 (or 26) will be described for any magnetic head component. A magnetic head 152 is adhesively attached to a backer plate 140 along with a ceramic edge guide 148. The backer plate is generally rectangular shaped with inner and outer sides and longitudinal and short edges. The inner side 142 has a pair of dowel locating pins 144 mounted, for example press mounted, in recesses formed in the inner side adjacent to the upper short edge and positioned on either side of a mounting hole 146 extending through the thickness of the plate. A rectangular recess is formed in the inner side parallel to the top latitudinal edge and below the locating pins for receiving the edge guide 148 which is adhesively mounted in the recess. The surface of the edge guide is ground flush with the surface of the backer plate. The longitudinal edges of the backer plate have L-shaped notches 150 formed to accommodate the rear tabs 116 of the head blocks during final assembly. A magnetic head 152 is mounted on the inner face of the backer either by adhesive or with fasteners so that the bottom end of the head is level with the bottom short edge of the backer and the concave head-to-media end of the head overlaps a portion of the edge guide 148 and is centered on the edge guide.

The magnetic head-to-media backer devices 28, 30 are preferably in the form of identical arched spring assemblies. Each arched spring assembly includes a rigid frame 160 and an arched spring 162. Each rigid frame has a center located mounting hole 164, a first locating hole 166, a second locating hole 168, and a cavity 170 for holding the arched spring. The arched spring assembly is positioned over the locating pins 144 above the magnetic head and is captured between the inner side 142 of the backer and the film guide cover plate 32 (or 34) by tightening a screw 172, inserted through the mounting holes 146 and 164, to a tapped mounting hole 173 of the film guide cover plate 32 (or 34). The magnetic head-to-media backer assemblies 23, 25 are mounted on the head blocks 50 by screws 174 inserted through mounting holes 176 into the tapped holes 119 of the head block.

Positional control of the magnetic head-to media assembly relative to the remainder of the follower assembly is established by the tabs 116 of head block 50 engaging the L-shaped notches 150 of the magnetic head-to media assembly.

The complete magnetic head-to-media interface apparatus is assembled according to the following sequence of steps.

The magnetic head backer is placed in a holder with the film edge guide slot facing up and adhesive is added to the sides and bottom of the slot. The film edge guide is placed in the slot with the beveled side facing up. After curing the top surface of the guide is finish ground to ensure the film edge guide and the head mounting surface are coplanar and sharp edges are removed by stoning. The dowel locating pins are pressed into the holes of the head backer so that the pins are at the set height of the edge guide surface. The above assembly is placed in a holding clamp and the magnetic head is placed on the backer with the top slightly overlapping the edge guide and centered relative to the dowel locating pins. In one embodiment of the assembly screws are used to fasten the head to the backer and penetrating adhesive is then applied along the edges of the magnetic head. In another embodiment the head is adhesively attached to the backer.

Figure 4:
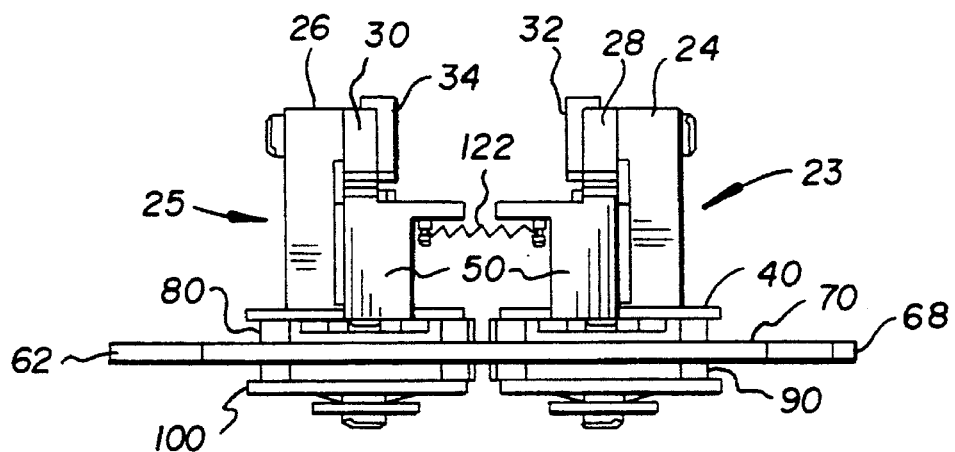
FIG. 4 is a side elevation view of a magnetic head-to-media interface apparatus.

Referring to FIGS. 1 and 4, the follower head block assembly, comprising mounting plate 62, top bearing plates 40, bottom bearing plates 100, upper ball cages 80, lower ball cages 90 and head blocks 50, is placed on a bench with the block 50 and post 120 facing up and the chamfered mounting tab end 68 on the right. The mounting plate 62, upper ball cages 80 and lower ball cages 90, as shown in FIGS. 3 and 4, can be formed by bonding the separate parts together as described above for the mounting plate assembly 60 or by an insert molding process to give a single unit. The appropriate magnetic head assembly 24 is positioned onto the right side block so that the head is nested into the head cavity on the block and the positioning rear tabs 116 on the block fit into the notches 150 on the head assembly. Two screws 174 are then used to fastened the head backer to the tapped holes in the head block. While holding the rigid frame portion of the magnetic head-to-media backer device 28 the device is positioned onto the top surface of the head. Keeping the cavity centered on the head backer the frame is slid onto the dowel locating pins and held there by the force of the arched spring. A film guide cover plate of the correct orientation 32 (i.e. left or right side) with the short side of the L-section covering the rigid frame section of the magnetic head-to-media backer device, is placed over the device and fastened to the head backer with the screw 172. The sequence is repeated for the other half of the assembly.

The construction of the apparatus is such that each side of the assembly can float on the bearing balls and move through limited angular and lateral distances. Thus each magnetic head floats relative to the centerline of a film or magnetic media and follows the media edges. By allowing both sides to float there is more tolerance available for aligning the assembly with other components in the film path to ensure smooth transport of the film. Positional inaccuracies are minimized by including interface features such as tabs, slots and notches to minimize assembly variations.

This invention provides a ball carrier mounting assembly and a film follower device with limited angular motion and minimal clearances between components which ensures that stable conditions prevail during film tracking and also prolongs the useful life of the assembly by reducing the opportunity for contamination. The asymmetric design of the mounting plate ensures correct orientation of the device when it is assembled into an apparatus. Design features are included which allow both sides of a magnetic head assembly to float relative to the centerline of a magnetic media.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

PARTS LIST 20. interface apparatus
22. follower assembly
23. backer assembly
24. head and backer assembly
25. backer assembly
26. head and backer assembly
28. arched spring assembly
30. arched spring assembly
32. film guide cover plate
34. film guide cover plate
40. top bearing plate
42. bearing plate notch (top)
44. bearing plate slot (top)
46. fastener
48. bearing plate cut-out
50. head block
52. swivel post
54. swivel post flat area
60. ball carrier mounting plate assembly
62. mounting plate
64. mounting plate body
66. end tab
68. end tab
70. mounting hole
72. mounting plate aperture
74. mounting plate locating hole
76. mounting plate locating hole
80. upper ball cage
82. upper ball cage lug
84. upper ball cage ball pocket
86. tube
88. cage recess
90. lower ball cage
92. lower ball cage lug
94. lower ball cage pocket
96. lower ball cage aperture
100. bottom bearing plate
102. bottom bearing plate notch
110. head block face plate
112. head block sidewall
114. side wall bottom tab
116. sidewall rear tab
118. media bearing plate
119. tapped hole
120. spring post
122. edge guide spring
126. bearing balls
130. screws
132. washers
134. spring washers
140. backer plate
142. backer plate inner side
144. locating pins
146. backer plate mounting hole
148. edge guide
150. L-shaped notches
152. magnetic head
160. rigid frame
162. arched spring
164. frame mounting hole
166. frame locating hole (1st)
168. frame locating hole (2nd)
170. cavity
172. mounting screw
173. mounting hole, tapped
174. screws
176. mounting holes

What is claimed is:

1. A ball carrier mounting assembly for limiting the angular movement of a film edge follower device comprising:

a pair of upper ball cages having upper and lower surfaces, each upper ball cage further comprising; a lug protruding from the upper surface for engaging a notch, a tube extending through the thickness of each upper cage and protruding below the lower surface, and a plurality of ball pockets extending through the thickness of each upper cage;

an asymmetrically shaped mounting plate located underneath the pair of upper ball cages for attaching the assembly to a fixed support, the mounting plate having a body and first and second end tabs, wherein each end tab of the mounting plate has a different configuration for orienting the assembly, the body having in addition a pair of apertures spaced from the tab ends for accommodating the tubes; and a pair of lower ball cages having upper and lower surfaces located below the mounting plate, each lower ball cage further comprising; a lug protruding downwards from the lower surface for engaging a notch, an aperture extending through a thickness of each lower cage for receiving the tube therein, and a plurality of ball pockets extending through the thickness of each lower cage.

2. The assembly according to claim 1, in which the ball pockets are located around the perimeter of each of the upper and the lower ball cages.

3. The assembly according to claim 2, in which one ball pocket is located adjacent to each corner of the upper and the lower ball cages.

4. The assembly according to claim 3, in which each ball cage comprises four ball pockets.

5. The assembly according to claim 1, further comprising a plurality of bearing balls located one to each ball pocket wherein the diameter of the bearing ball is greater than the depth of the ball pocket.

6. The assembly according to claim 5, in which the diameter of the bearing ball is less than the length of the ball pocket.

7. The assembly according to claim 6, in which the pockets are generally obround shaped.

8. The assembly according to claim 1, in which the first end tab is generally rectangular with a squared end.

9. The assembly according to claim 1, in which the second end tab is generally rectangular with a chamfered end.

10. The assembly according to claim 1, in which each of the first and second end tabs has a locating hole there through.

11. The assembly according to claim 10, in which the locating holes have shapes selected from round and generally obround.

12. The assembly according to claim 11, in which one of the holes is round and the other is generally obround.

13. The assembly according to claim 1, in which the tubes and the apertures are generally obround shaped.

14. The assembly according to claim 1, in which the ball cages are adhesively attached to the mounting plate.

15. The assembly according to claim 1, in which the ball cages and the mounting plate are insert molded together as a single unit.

16. The assembly according to claim 1, further comprising:

a pair of top bearing plates mounted to the upper ball cages, each top bearing plate further comprising a notch for engaging the upper cage lug, and a swivel post protruding below each top bearing plate, each swivel post having an end for receiving a fastener; and a pair of bottom bearing plates mounted to the lower surfaces of the lower ball cages, each bottom bearing plate further comprising a notch for engaging the lower cage lug, and an aperture in each bottom bearing plate for receiving the end of the swivel post.

17. The assembly according to claim 16, in which the notch is generally rectangular.

18. The assembly according to claim 16, in which the swivel post end and the lower bearing plate aperture are generally D-shaped.

19. The assembly according to claim 16, in which the lug is round, the round lug having a diameter less than the width of the notch to permit limited angular movement of the follower assembly.

20. The assembly according to claim 16, in which the tubes and the apertures are generally obround shaped.

21. The assembly according to claim 20, in which the diameter of the swivel post is less than the length of the obround shaped opening of the tube.

22. The assembly according to claim 1, in which the ball cages and the mounting plate comprise materials selected from metal and plastic.

23. The assembly according to claim 22, in which the plastic is an acetal.

24. A ball carrier mounting assembly for limiting the angular movement of a film follower device comprising:

a pair of generally rectangular upper ball cages having upper and lower surfaces, each upper ball cage further comprising: a lug protruding from the upper surface adjacent to a center facing short end for engaging a notch, a centrally located tube extending through a thickness of each upper ball cage and protruding below the lower surface, and a plurality of elongated ball pockets extending through the thickness of each upper ball cage;

an asymmetrically shaped, elongated mounting plate located underneath the pair of upper ball cages for attaching the assembly to a fixed support, the mounting plate having a generally rectangular body and first and second narrower end tabs, wherein each end tab of the mounting plate has a different configuration for orienting the apparatus, the body having in addition a pair of apertures spaced from the tab ends for accommodating the tubes; and a pair of generally rectangular lower ball cages having upper and lower surfaces located below the mounting plate, each lower ball cage further comprising; a lug protruding downwards from the lower surface adjacent to a center facing short end for engaging a notch, a centrally located aperture extending through a thickness of each lower ball cage for receiving the tube therein, and a plurality of elongated ball pockets extending through the thickness of each lower ball cage.

25. The assembly according to claim 24, further comprising:

a pair of generally rectangular top bearing plates mounted to the upper ball cages, each top bearing plate further comprising a generally rectangular shaped notch in the center facing latitudinal edge for engaging the upper cage lug, and a swivel post protruding below each top bearing plate, each swivel post having a generally D-shaped tapped end for receiving a fastener; and a pair of generally rectangular bottom bearing plates mounted to the lower surfaces of the lower ball cages, each bottom bearing plate further comprising a notch in the center facing latitudinal edge for engaging the lower cage lug, and a generally D-shaped aperture in each lower bearing plate for receiving the D-shaped end of the swivel post.

26. A magnetic head-to-media interface apparatus for recording information on a magnetic film media comprising:

a pair of spaced magnetic head-to-media backer assemblies, each of said assemblies comprising a magnetic head and a magnetic head-to-media backer device, for urging the magnetic media into contact with the magnetic head;

a pair of head backers for mounting the pair of magnetic head-to-media backer assemblies thereon; and a follower assembly connected to the pair of head backers, the follower assembly comprising;

a pair of upper ball cages having upper and lower surfaces, each upper ball cage further comprising; a lug protruding from the upper surface for engaging a notch, a tube extending through a thickness of each upper ball cage and protruding below the lower surface, and a plurality of ball pockets extending through the thickness of each upper ball cage;

an asymmetrically shaped, mounting plate located underneath the pair of upper ball cages for attaching the assembly to a fixed support, the mounting plate having a body and first and second end tabs, wherein each end tab of the mounting plate has a different configuration for orienting the apparatus, the body having in addition a pair of apertures spaced from the tab ends for accommodating the tubes;

a pair of lower ball cages having upper and lower surfaces located below the mounting plate, each lower ball cage further comprising: a lug protruding downwards from the lower surface for engaging a notch, an aperture extending through a thickness of each lower ball cage for receiving the tube therein, and a plurality of ball pockets extending through the thickness of each lower ball cage;

a pair of top bearing plates mounted to the upper ball cages for supporting a magnetic head assembly, each top bearing plate further comprising a notch for engaging the upper cage lug, and a swivel post protruding below each top bearing plate, each swivel post having an end for receiving a fastener;

a pair of bottom bearing plates mounted to the lower surfaces of the lower ball cages each bottom bearing plate further comprising a notch for engaging the lower cage lug, and an aperture in each bottom bearing plate for receiving the end of the swivel post; and a pair of head blocks connected between the pair of top bearing plates and the pair of head backers; wherein each magnetic head floats relative to a centerline of the magnetic media.

* * * * *